United States Patent
Larsson et al.

(10) Patent No.: US 9,789,441 B2
(45) Date of Patent: Oct. 17, 2017

(54) SINGLE OR DUAL LAYER AMMONIA SLIP CATALYST

(71) Applicant: Johnson Matthey Public Limited Company, London (GB)

(72) Inventors: Mikael Larsson, Gothenburg (SE); David Micallef, Royston (GB); Jing Lu, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/184,267

(22) Filed: Jun. 16, 2016

(65) Prior Publication Data
US 2016/0367938 A1    Dec. 22, 2016

Related U.S. Application Data

(60) Provisional application No. 62/181,303, filed on Jun. 18, 2015.

(51) Int. Cl.
*B01D 53/94* (2006.01)
*B01J 23/42* (2006.01)
(Continued)

(52) U.S. Cl.
CPC ..... *B01D 53/9418* (2013.01); *B01D 53/9477* (2013.01); *B01J 23/22* (2013.01); *B01J 23/42* (2013.01); *B01J 23/8472* (2013.01); *B01J 29/06* (2013.01); *B01J 29/072* (2013.01); *B01J 29/763* (2013.01); *B01J 29/7615* (2013.01);
(Continued)

(58) Field of Classification Search
CPC ............ B01D 53/9418; B01D 53/9431; B01D 2255/1021; B01D 2255/20738; B01D 2255/20761; B01D 2255/50; B01D 2257/402; B01D 2257/404; B01D 2258/012; B01D 2255/9022; B01D 2255/9025; F01N 3/2066; F01N 3/2073; B01J 23/42; B01J 23/70; B01J 32/00
See application file for complete search history.

(56) References Cited

U.S. PATENT DOCUMENTS

| 4,010,238 A | 3/1977 | Shiraishi et al. |
| 4,085,193 A | 4/1978 | Nakajima et al. |

(Continued)

FOREIGN PATENT DOCUMENTS

| EP | 0773057 A1 | 5/1997 | |
| EP | 2859944 A1 * | 4/2015 | ......... B01D 53/8628 |

(Continued)

*Primary Examiner* — Timothy Vanoy

(57) ABSTRACT

A catalyst article having an extruded support having a plurality of channels through which exhaust gas flows during operation of an engine, and a single layer coating or a bi-layer coating on the support, where the extruded support contains a third SCR catalyst, the single layer coating and the bilayer-coating contain platinum on a support with low ammonia storage and a first SCR catalyst. The catalytic articles are useful for selective catalytic reduction (SCR) of NOx in exhaust gases and in reducing the amount of ammonia slip. Methods for producing such articles are described. Methods of using the catalytic articles in an SCR process, where the amount of ammonia slip is reduced, are also described.

15 Claims, 1 Drawing Sheet

(51) Int. Cl.
  *B01J 23/72* (2006.01)
  *B01J 29/00* (2006.01)
  *B01J 32/00* (2006.01)
  *F01N 3/28* (2006.01)
  *B01J 23/847* (2006.01)
  *B01J 35/00* (2006.01)
  *B01J 29/06* (2006.01)
  *B01J 29/76* (2006.01)
  *B01J 29/83* (2006.01)
  *B01J 29/85* (2006.01)
  *B01J 35/04* (2006.01)
  *B01J 37/00* (2006.01)
  *F01N 3/20* (2006.01)
  *B01J 23/22* (2006.01)
  *B01J 29/072* (2006.01)
  *B01J 29/78* (2006.01)
  *B01J 29/80* (2006.01)
  *F01N 13/16* (2010.01)

(52) U.S. Cl.
  CPC .............. *B01J 29/783* (2013.01); *B01J 29/80* (2013.01); *B01J 29/83* (2013.01); *B01J 29/85* (2013.01); *B01J 35/0006* (2013.01); *B01J 35/04* (2013.01); *B01J 37/0009* (2013.01); *F01N 3/2066* (2013.01); *F01N 3/2828* (2013.01); *F01N 13/16* (2013.01); *B01D 2255/1021* (2013.01); *B01D 2255/20738* (2013.01); *B01D 2255/20761* (2013.01); *B01D 2255/904* (2013.01); *B01D 2255/9025* (2013.01); *B01D 2255/911* (2013.01); *B01J 2029/062* (2013.01); *F01N 2330/06* (2013.01); *F01N 2370/04* (2013.01); *F01N 2510/063* (2013.01); *F01N 2510/068* (2013.01); *F01N 2570/14* (2013.01); *F01N 2570/18* (2013.01)

(56) References Cited

U.S. PATENT DOCUMENTS

| | | | | |
|---|---|---|---|---|
| 4,104,154 | A  * | 8/1978 | Mitsche | B01J 23/40 208/138 |
| 8,603,423 | B2 * | 12/2013 | Andersen | B01J 23/30 423/213.2 |
| 2006/0051277 | A1 * | 3/2006 | Schwefer | B01D 53/8628 423/239.2 |
| 2008/0292519 | A1 | 11/2008 | Caudle et al. | |
| 2011/0033374 | A1 * | 2/2011 | Prest | B01D 53/9454 423/700 |
| 2011/0271664 | A1 | 11/2011 | Boorse et al. | |
| 2014/0157763 | A1 | 6/2014 | Chandler et al. | |
| 2014/0212350 | A1 | 7/2014 | Andersen et al. | |
| 2014/0219879 | A1 | 8/2014 | Bull et al. | |
| 2014/0219880 | A1 | 8/2014 | Boorse | |
| 2015/0037233 | A1 | 2/2015 | Fedeyko et al. | |
| 2016/0367975 | A1 * | 12/2016 | Lu | B01J 37/0244 |
| 2017/0056859 | A1 * | 3/2017 | Kim | B01J 23/30 |

FOREIGN PATENT DOCUMENTS

| | | | | |
|---|---|---|---|---|
| GB | 2477628 | A * | 8/2011 | .............. B01J 23/30 |
| JP | H09253453 | A | 9/1997 | |
| JP | 2005319422 | A * | 11/2005 | .............. B01J 23/30 |
| WO | 2008106523 | A2 | 9/2008 | |
| WO | 2014080220 | A1 | 5/2014 | |

* cited by examiner where and Pt on Support = platinum on a support with low ammonia storage

SINGLE OR DUAL LAYER AMMONIA SLIP CATALYST

This application claims the benefit of the filing date of the provisional application 62/181,303 filed on Jun. 18, 2015.

FIELD OF THE INVENTION

The invention relates to ammonia slip catalysts (ASC), articles containing ammonia slip catalysts and methods of manufacturing and using such articles to reduce ammonia slip.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

In a first aspect, the invention relates to a catalyst article comprising: (a) an extruded support having an inlet, an outlet and a plurality of channels through which exhaust gas flows during operation of an engine, and (b) a single layer coating or a bi-layer coating on the support, where the extruded support comprises a third SCR catalyst, the single layer coating comprises a blend of platinum on a support with low ammonia storage with a first SCR catalyst, and the bi-layer coating comprises a bottom layer and a top layer, where the bottom layer is located between the top layer and the extruded support, the bottom layer comprises a blend of platinum on a support with low ammonia storage with a first SCR catalyst, and the top layer comprises a second SCR catalyst.

In another aspect, the invention relates to an exhaust system comprising a catalyst of the first aspect of the invention and a means for forming $NH_3$ in the exhaust gas.

In yet another aspect, the invention relates to a vehicle comprising an exhaust system comprising a catalyst of the first aspect of the invention and a means for forming $NH_3$ in the exhaust gas.

In still another aspect, the invention relates to a method of improving the $N_2$ yield from ammonia in an exhaust gas at a temperature from about 250° C. to about 350° C. by contacting an exhaust gas comprising ammonia with a catalyst article of the first aspect of the invention.

In another aspect, the invention relates to a method of reducing $N_2O$ formation from $NH_3$ in an exhaust gas, the method comprising contacting an exhaust gas comprising ammonia with a catalyst article of the first aspect of the invention.

DETAILED DESCRIPTION OF THE INVENTION

Figure 1:
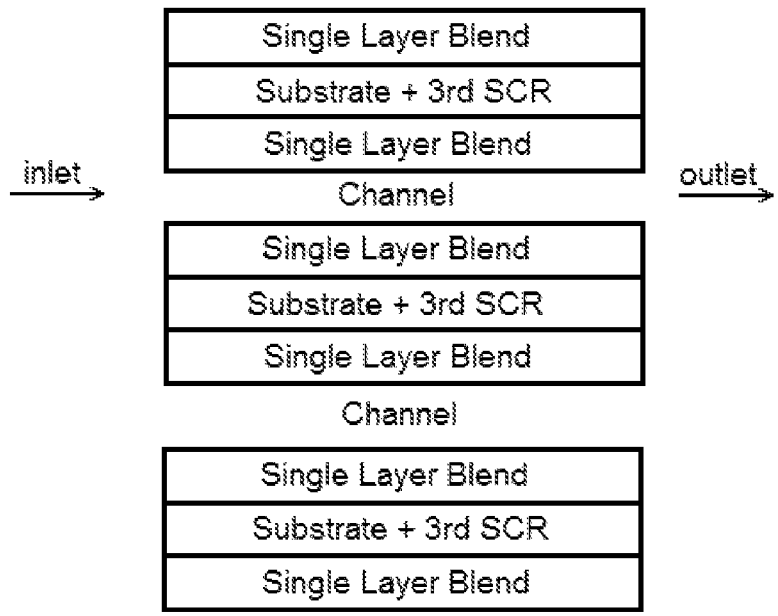
FIG. 1 is a diagram of a configuration in which a single layer blend of an ammonia slip catalyst is located on each side of a substrate containing a third SCR catalyst.
Figure 2:
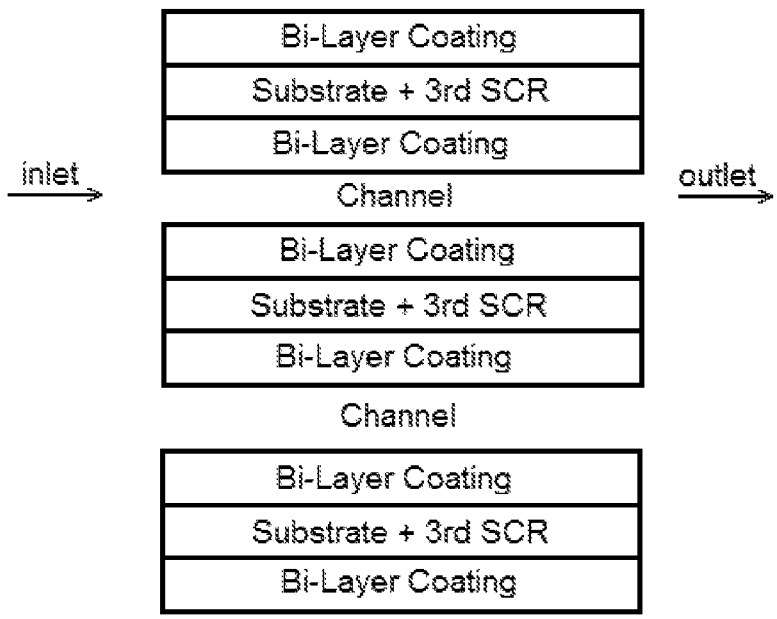
FIG. 2 is a diagram of a configuration in which a bi-layer coating having a bottom layer comprising a mixture of platinum on a low ammonia storage support and a first SCR catalyst with a top layer comprising a second SCR catalyst is located on each side of a substrate containing a third SCR catalyst.
Figure 2:
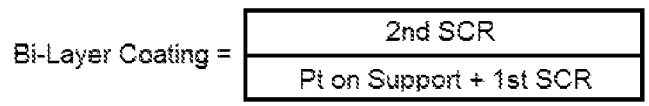

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "ammonia slip", means the amount of unreacted ammonia that passes through the SCR catalyst.

The term "support" means the material to which a catalyst is fixed.

The term "a support with low ammonia storage" means a support that stores less than 0.001 mmol $NH_3$ per $m^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the molecular sieve or zeolite has a framework type selected from the group consisting of BEA, CDO, CON, FAU, MEL, MFI and MWW, even more preferably the framework type is selected from the group consisting of BEA and MFI.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "$N_2$ selectivity" means the percent conversion of ammonia into nitrogen.

In a first aspect of the invention, a catalyst article comprises: (a) an extruded support having an inlet, an outlet and a plurality of channels through which exhaust gas flows during operation of an engine, and (b) a single layer coating or a bi-layer coating on the support, where the extruded support comprises a third SCR catalyst, the single layer coating comprises a blend of platinum on a support with low ammonia storage with a first SCR catalyst, and the bi-layer coating comprises a bottom layer and a top layer, where the bottom layer is located between the top layer and the extruded support, the bottom layer comprises a blend of platinum on a support with low ammonia storage with a first SCR catalyst, and the top layer comprises a second SCR catalyst. The support with low ammonia storage can be a siliceous support, where the siliceous support can comprise a silica or a zeolite with silica-to-alumina ratio of ≥100, preferably ≥200, more preferably ≥250, even more preferably ≥300, especially ≥400, more especially ≥500, even more especially ≥750, and most preferably ≥1000. The siliceous support preferably comprises BEA, CDO, CON, FAU, MEL, MFI or MWW. The catalyst article can provide an improvement in $N_2$ yield from ammonia at a temperature from about 250° C. to about 300° C. compared to a catalyst comprising a comparable formulation in which the first SCR catalyst is present as a first layer and the platinum on a siliceous support is present in a second layer and gas comprising $NH_3$ passes through the first layer before passing through the second layer. The catalyst article can protect the platinum from one or more substances present in the catalyst that can poison the platinum, such as vanadium. The catalytic article may protect platinum from other poisons such as potassium, sodium, iron and tungsten. When the first SCR catalyst comprises vanadium, the catalyst article can provide reduced deactivation compared to a catalyst comprising a comparable formulation in which the first SCR catalyst is present as a first layer and the platinum on a siliceous support is present in a second layer and gas comprising $NH_3$ passes through the first layer before passing through the second layer.

The term "active component loading" refers to the weight of the support of platinum+the weight of platinum+the weight of the first SCR catalyst in the blend. Platinum can be present in the catalyst in an active component loading from about 0.01 to about 0.3 wt. %, inclusive, preferably from about 0.03-0.2 wt. %, inclusive, more preferably, from about 0.05-0.17 wt. %, inclusive, most preferably, from about 0.07-0.15 wt. %, inclusive.

Additional catalysts such as palladium (Pd), gold (Au) silver (Ag), ruthenium (Ru) or rhodium (Rh) can be present with Pt, preferably in the blend with Pt.

SCR Catalysts

In various embodiments, the compositions can comprise one, two or three SCR catalysts. The first SCR catalyst, which is always present in the compositions, can be present either (1) in a blend with Pt on a support with low ammonia storage or (2) in a top layer when the catalysts are present in a bilayer and Pt is present in a bottom layer. The first SCR catalyst is preferably a Cu-SCR catalyst, an Fe-SCR catalyst or a mixed oxide, more preferably a Cu-SCR catalyst or a mixed oxide, most preferably a Cu-SCR catalyst. The Cu-SCR catalyst comprises copper and a molecular sieve. The Fe-SCR catalyst comprises iron and a molecular sieve. Molecular sieves are further described below. The molecular sieve can be an aluminosilicate, an aluminophosphate (AlPO), a silico-aluminophosphate (SAPO), or mixtures thereof. The copper or iron can be located within the framework of the molecular sieve and/or in extra-framework (exchangeable) sites within the molecular sieve.

The second and third SCR catalysts can be the same or different. The second and third SCR catalyst can be a base metal, an oxide of a base metal, a noble metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The second SCR catalyst can comprise a promoted Ce—Zr or a promoted $MnO_2$. Preferably, the promoter comprises Nb. The noble metal can be platinum (Pt), palladium (Pd), gold (Au) silver (Ag), ruthenium (Ru) or rhodium (Rh), or a mixture thereof. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Any of the SCR catalysts can comprise a small pore, a medium pore or a large pore molecular sieve, or a mixture thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms. The second and/or third SCR catalysts can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

Any of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

Any of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

Any of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

The molecular sieves in the Cu-SCR and Fe-SCR catalysts are preferably selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof. More preferably, the molecular sieves in the Cu-SCR and Fe-SCR are selected from the group consisting of AEI, AFX, BEA, CHA, DDR, ERI, FER, ITE, KFI, LEV, MFI and SFW, and mixtures and/or intergrowths thereof.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the second and third catalysts comprise a Cu-SCR catalyst comprising copper and a molecular sieve, an Fe-SCR catalyst comprising iron and a molecular sieve, a vanadium based catalyst, a promoted Ce—Zr or a promoted $MnO_2$.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) or iron (Fe) supported small pore molecular sieve having from about 0.1 to about 20.0 wt. % copper or iron of the total weight of the catalyst. More preferably copper or iron is present from about 0.5 wt. % to about 15 wt. % of the total weight of the catalyst. Most preferably copper or iron is present from about 1 wt. % to about 9 wt. % of the total weight of the catalyst.

The first SCR catalyst can be a Cu-SCR catalyst comprising copper and a small pore molecular sieve or an Fe-SCR catalyst comprising iron and a small pore molecular sieve. The small pore molecular sieve can be an aluminosilicate, an aluminophosphate (AlPO), a silico-aluminophosphate (SAPO), or mixtures thereof. The small pore molecular sieve can be selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably, the small pore molecular sieve can be selected from the group of Framework Types consisting of CHA, LEV, AEI, AFX, ERI, SFW, KFI, DDR and ITE. The ratio of the amount of the first SCR catalyst to the amount of platinum on the support with low ammonia storage can be in the range of at least one of: (a) 0:1 to 300:1, (b) 3:1 to 300:1, (c) 7:1 to 100:1; and (d) 10:1 to 50:1, inclusive, based on the weight of these components. Platinum can be present from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+the weight of the first SCR catalyst in the blend.

The second SCR catalyst and the third SCR catalyst can, independent of each other, be a base metal, an oxide of a base metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), and copper (Cu), and mixtures thereof. The catalyst article can further comprise at least one base metal promoter. The molecular sieve or the metal exchanged molecular sieve can be small pore, medium pore, large pore or a mixture thereof. The second and/or third SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The second and/or third SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. The second and/or third SCR catalyst can preferably comprise a small pore molecular sieve selected from the group of Framework Types consisting of CHA, LEV, AEI, AFX, ERI, SFW, KFI, DDR and ITE. The second and/or third SCR catalyst can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. The second and/or third SCR catalyst preferably comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. The third SCR catalyst preferably comprises vanadium, an Fe zeolite, a Cu zeolite, or a Ce—Zr based catalyst doped with Fe, W or Nb.

The catalysts described herein can be used in the SCR treatment of exhaust gases from various engines. The engines can be on a vehicle, a stationary engine, an engine in a power plant, or a gas turbine. One of the properties of a catalyst comprising a blend of platinum on a siliceous support with a first SCR catalyst, where the first SCR catalyst is a Cu-SCR or Fe-SCR catalyst, is that it can provide an improvement in $N_2$ yield from ammonia at a temperature from about 250° C. to about 350° C. compared to a catalyst comprising a comparable formulation in which the first SCR catalyst is present as a first layer and platinum is supported on a layer that stores ammonia is present in a second layer and gas comprising $NH_3$ passes through the first layer before passing through the second layer. Another property of a catalyst comprising a blend of platinum on a support with low ammonia storage with a first SCR catalyst, where the first SCR catalyst is a Cu-SCR catalyst or an Fe-SCR catalyst, is that it can provide reduced $N_2O$ formation from $NH_3$ compared to a catalyst comprising a comparable formulation in which the first SCR catalyst is present as a first layer and platinum supported on a support that stores ammonia is present in a second layer and gas comprising $NH_3$ passes through the first layer before passing through the second layer.

The substrate for the catalyst may be any material typically used for preparing automotive catalysts that comprises a flow-through or filter structure, such as a honeycomb structure, an extruded support, a metallic substrate, or a SCRF. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thinwalled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40% and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a filter or an SCRF.

A washcoat comprising a blend of platinum on a siliceous support and a first SCR catalyst, where the first SCR catalyst is preferably a Cu-SCR catalyst or an Fe-SCR catalyst, can be applied to the inlet side of the substrate using a method known in the art. After application of the washcoat, the composition can be dried and calcined. When the composition comprises a second SCR, the second SCR can be applied in a separate washcoat to a calcined article having the bottom layer, as described above. After the second washcoat is applied, it can be dried and calcined as performed for the first layer.

The substrate with the platinum containing layer can be dried and calcined at a temperature within the range of 300° C. to 1200° C., preferably 400° C. to 700° C., and more preferably 450° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

An exhaust system can comprise a catalyst of the first aspect of the invention and a means for forming $NH_3$ in the exhaust gas. An exhaust system can further comprise a second catalyst selected from the group consisting of a diesel oxidation catalyst (DOC), a diesel exotherm catalyst (DEC), a selective catalytic reduction on filter (SCRF) or a catalyzed soot filter (CSF), where the second catalyst is located downstream of the catalyst of the first aspect of the invention. An exhaust system can further comprise a second catalyst selected from the group consisting of an SCR catalyst, a selective catalytic reduction on filter (SCRF), a diesel oxidation catalyst (DOC), a diesel exotherm catalyst (DEC), a NOx adsorber catalyst (NAC) (such as a lean NOx trap (LNT), a NAC, a passive NOx adsorber (PNA), a catalyzed soot filter (CSF), or a Cold Start Concept (CSC) catalyst, where the second catalyst is located upstream of the catalyst of the first aspect of the invention.

An exhaust system can comprise a catalyst of the first aspect of the invention, an SCR catalyst and DOC catalyst, where the SCR catalyst is located between the catalyst of the first aspect of the invention and the DOC catalyst. The exhaust system can comprise a platinum group metal before an SCR catalyst where the amount of the platinum group metal is sufficient to generate an exotherm. The exhaust system can further comprise a promoted-Ce—Zr or a promoted-$MnO_2$ located downstream of the catalyst of the first aspect of the invention.

An engine can comprise an exhaust system as described above. The engine can be an engine on a vehicle, a stationary engine, an engine in a power plant, or a gas turbine.

A vehicle can comprise an exhaust system comprising a catalyst of the first aspect of the invention and a means for forming $NH_3$ in the exhaust gas. The vehicle can be a car, a light truck, a heavy duty truck or a boat.

A method of improving the $N_2$ yield from ammonia in an exhaust gas at a temperature from about 250° C. to about 300° C. comprises contacting an exhaust gas comprising ammonia with a catalyst of the first aspect of the invention. The improvement in yield can be about 10% to about 20% compared to a catalyst comprising a comparable formulation in which the first SCR catalyst is present as a first layer and the platinum on a siliceous support is present in a second layer and gas comprising $NH_3$ passes through the first layer before passing through the second layer.

A method of reducing $N_2O$ formation from $NH_3$ in an exhaust gas comprises contacting an exhaust gas comprising ammonia with a catalyst of the first aspect of the invention. The reduction in $N_2O$ formation can be about 20% to about 40% compared to a catalyst comprising a comparable formulation in which the first SCR catalyst is present as a first layer and the platinum on a siliceous support is present in a second layer and gas comprising $NH_3$ passes through the first layer before passing through the second layer.

The following examples merely illustrate the invention; the skilled person will recognize many variations that are within the spirit of the invention and scope of the claims.

EXAMPLES

Example 1: A Selective ASC on an Extruded SCR Catalyst

An extruded SCR catalyst containing vanadium is coated from the outlet side with a washcoat comprising a blend of platinum on a support with low ammonia storage with Cu-CHA.

Example 2: A Selective ASC on an Extruded SCR Catalyst

An extruded SCR catalyst containing an Fe-zeolite is coated from the outlet side with a washcoat comprising a blend of platinum on a support with low ammonia storage with Cu-CHA.

Compared with a conventional single layer ASC, where the single layer coating comprises platinum on a support, such as an alumina, without any SCR catalyst in the coating, the ASC described herein provides reduced selectivity of both $N_2O$ and NOx. This results in increased selectivity towards $N_2$ over the full temperature range.

Example 3: A Selective ASC on an Extruded SCR Catalyst

An extruded SCR catalyst containing vanadium is coated from the outlet side with a washcoat comprising platinum on a support with low ammonia storage to form a bottom layer. A second washcoat comprising Cu-CHA is placed over the bottom layer to form a top layer.

Example 4: A Selective ASC on an Extruded SCR Catalyst

An extruded SCR catalyst containing an Fe-zeolite is coated from the outlet side with a washcoat comprising platinum on a support with low ammonia storage to form a bottom layer. A second washcoat comprising Cu-CHA is placed over the bottom layer to form a top layer.

Compared with a conventional dual layer ASC, where the bottom coating comprises platinum on e.g. alumina, and the top coating comprises an SCR catalyst, the ASC described herein provides reduced selectivity of both $N_2O$ and NOx. This results in increased selectivity towards $N_2$ over the full temperature range. In addition, the back pressure will be reduced because of an overall thinner coating layer.

In the above examples, platinum is on a support with low ammonia storage. The use of the support with low ammonia storage helps protect the platinum from exposure to materials, such as vanadium, that can poison, or negatively affect the platinum.

Example 5: SCRF with ASC

An SCRF filter is coated on the outlet face of the filter with a washcoat comprising platinum on a support with low ammonia storage to form a bottom layer. A second washcoat comprising Cu-CHA is placed over the bottom layer to form a top layer.

Example 6: SCRF with ASC

An SCRF filter is coated on the outlet face of the filter with a washcoat comprising a blend of platinum on a support with low ammonia storage and Cu-CHA.

The SCRF with ASC of Examples 5 and 6 provides the same results and benefits as described for Examples 1-4.

The preceding examples are intended only as illustrations; the following claims define the scope of the invention.

We claim:

1. A catalyst article comprising: (a) an extruded support having an inlet, an outlet and a plurality of channels through which exhaust gas flows during operation of an engine, and (b) a single layer coating or a bi-layer coating on the support, where, the single layer coating comprises a blend of platinum on a support with low ammonia storage with a first SCR catalyst, and the bi-layer coating comprises a bottom layer and a top layer, where the bottom layer is located between the top layer and the extruded support, the bottom layer comprises a blend of platinum on a support with low ammonia storage with a first SCR catalyst, the top layer comprises a second SCR catalyst, and the extruded support comprises a third SCR catalyst.

2. The catalyst of claim 1, where the support with low ammonia storage is a siliceous support.

3. The catalyst of claim 1, where the ratio of the amount of the first SCR catalyst to the amount of platinum on the support with low ammonia storage is in the range of at least one of: (a) 0:1 to 300:1, (b) 3:1 to 300:1, (c) 7:1 to 100:1; and (d) 10:1 to 50:1, inclusive, based on the weight of these components.

4. The catalyst of claim 1, where the first SCR catalyst is a Cu-SCR catalyst comprising copper and a small pore molecular sieve, an Fe-SCR catalyst comprising iron and a small pore molecular sieve, or a mixed oxide.

5. The catalyst article of claim 1, where the second SCR catalyst and the third SCR catalyst are, independent of each other, a base metal, an oxide of a base metal, a molecular sieve, a metal exchanged molecular sieve or a mixture thereof.

6. The catalyst article of claim 5, where the molecular sieve or the metal exchanged molecular sieve is small pore, medium pore, large pore or a mixture thereof.

7. The catalyst article of claim 1, where the catalyst provides an improvement in $N_2$ yield from ammonia at a temperature from about 250° C. to about 300° C. compared to a catalyst comprising a comparable formulation in which the first SCR catalyst is present as a first layer and the platinum on a siliceous support is present in a second layer and gas comprising $NH_3$ passes through the first layer before passing through the second layer.

8. The catalyst article of claim 1, where, when the first SCR catalyst comprises vanadium, the catalyst article provides reduced deactivation compared to a catalyst comprising a comparable formulation in which the first SCR catalyst is present as a first layer and the platinum on a siliceous support is present in a second layer and gas comprising $NH_3$ passes through the first layer before passing through the second layer.

9. An exhaust system comprising the catalyst article of claim 1 and a means for forming $NH_3$ in the exhaust gas.

10. An exhaust system comprising the catalyst of claim 1, an SCR catalyst and DOC catalyst, where the SCR catalyst is located between the catalyst of claim 1 and the DOC catalyst.

11. The exhaust system of claim 9, where the exhaust system comprises a platinum group metal before an SCR catalyst and the amount of the platinum group metal is sufficient to generate an exotherm.

12. A method of improving the $N_2$ yield from ammonia in an exhaust gas at a temperature from about 250° C. to about 300° C., the method comprising contacting an exhaust gas comprising ammonia with a catalyst of claim 1.

13. The method of claim 12, where the improvement in yield is about 10% to about 20% compared to a catalyst comprising a comparable formulation in which the first SCR catalyst is present as a first layer and the platinum on a siliceous support is present in a second layer and gas comprising $NH_3$ passes through the first layer before passing through the second layer.

14. A method of reducing $N_2O$ formation from $NH_3$ in an exhaust gas, the method comprising contacting an exhaust gas comprising ammonia with a catalyst of claim 1.

15. The method of claim 14, where the reduction in $N_2O$ formation is about 20% to about 40% compared to a catalyst comprising a comparable formulation in which the first SCR catalyst is present as a first layer and the platinum on a siliceous support is present in a second layer and gas comprising $NH_3$ passes through the first layer before passing through the second layer.

* * * * *